(12) United States Patent
Ku

(10) Patent No.: US 6,691,974 B2
(45) Date of Patent: Feb. 17, 2004

(54) SUPPORT FRAME FOR PREVENTING A HEAVY-DUTY MACHINERY FROM FALLING

(76) Inventor: Feng-Lin Ku, No. 509, Pao Hsin Rd., Hsin Cheng Village, Pao Shan Hsian, Hsin Chu Hsien (TW)

( * ) Notice: Subject to any disclaimer, the term of this patent is extended or adjusted under 35 U.S.C. 154(b) by 240 days.

(21) Appl. No.: 09/929,003

(22) Filed: Aug. 15, 2001

(65) Prior Publication Data

US 2001/0054673 A1 Dec. 27, 2001

(30) Foreign Application Priority Data

Jun. 27, 2001 (TW) ........................... 90210764 U

(51) Int. Cl.[7] ................................................ F16M 3/00
(52) U.S. Cl. ..................................................... 248/638
(58) Field of Search ................................ 248/678, 562, 248/638, 677, 675, 346.1, 581

(56) References Cited

U.S. PATENT DOCUMENTS 2,078,445 A * 4/1937 Geyer
2,217,788 A * 10/1940 Blake
5,556,071 A * 9/1996 Bellamy
6,129,328 A * 10/2000 Knurek

* cited by examiner

Primary Examiner—Alvin Chin-Shue
(74) Attorney, Agent, or Firm—Browdy and Niemark, P.L.L.C.

(57) ABSTRACT

A support frame is designed to prevent a heavy-duty machinery from falling and is formed of a support board and a pad support. The support board has an inverted U-shaped cross section and is provided at the bottom end of two side segments thereof with a level board. Each side segment and each level board are provided therebetween with a reinforcing rib. The pad support has an inverted U-shaped cross section and is located at the bottom of the support board such that the pad support is disposed between the two side segments of the support board, and that the pad support is connected with the support board, and further that a receiving space is formed between the pad support and the support board. The level boards are fixed on the ground surface to provide a tremendous fixation force. The heavy-duty machinery is securely fixed on the ground surface by a plurality of the support frames of the present invention.

6 Claims, 5 Drawing Sheets

SUPPORT FRAME FOR PREVENTING A HEAVY-DUTY MACHINERY FROM FALLING

FIELD OF THE INVENTION

The present invention relates generally to a support structure, and more particularly to a support frame which is mounted under a heavy-duty machinery to prevent the heavy-duty machinery from being jolted, displaced or fallen by the earthquake.

BACKGROUND OF THE INVENTION

The manufacturing industry is highly automatic such that the automatic machineries are provided with an electric generator to furnish power in the event of the power outage, thereby improving the productivity and preventing the material waste caused by the work stoppage. In addition, the earthquake may be the culprit for the production interruption, especially the earthquake greater than five on the Richter scale. In view of the earthquake translocation, the production machinery is vulnerable to damage. The power generator of the production machinery is also vulnerable to the earthquake translocation, thereby resulting in the production interruption.

SUMMARY OF THE INVENTION

It is the primary objective of the present invention to provide a support frame for preventing the heavy-duty machinery from being translocated by the earthquake.

It is another objective of the present invention to provide a support frame for preventing the heavy-duty machinery from being translocated so as to avert damages to the machinery and injuries to machine operators.

The support frame of the present invention comprises a support board which has an inverted U-shaped cross section and is provided at the bottom end of two side segments thereof with a level board. Each side segment and each level board are provided therebetween with a reinforcing rib. A pad support has an inverted U-shaped cross section and is located at the bottom of the support board such that the pad support is disposed between the two side segments of the support board, and that the pad support is connected with the support board, and further that a receiving space is formed between the pad support and the support board. The level boards are fixed on the ground surface to provide a very strong fixation force. The heavy-duty machinery is securely fixed on the ground surface by a plurality of the support frames of the present invention.

The detailed structures, features and effects of the present invention will be more readily understood upon a thoughtful deliberation of the following detailed description of a preferred embodiment of the present invention with reference to the accompanying drawings.

DETAILED DESCRIPTION OF THE INVENTION

Figure 1:
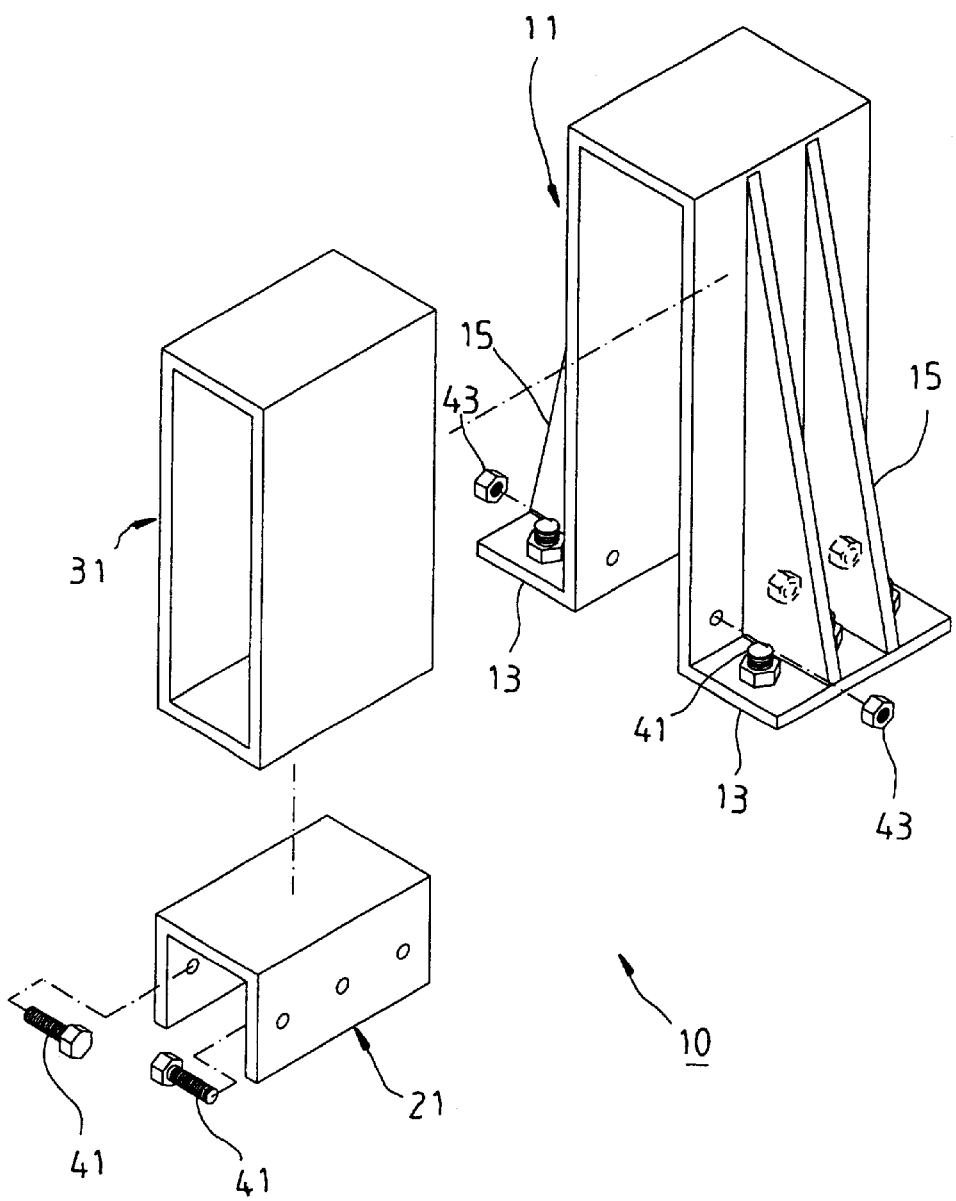
FIG. 1 shows an exploded view of the preferred embodiment of the present invention.
Figure 2:
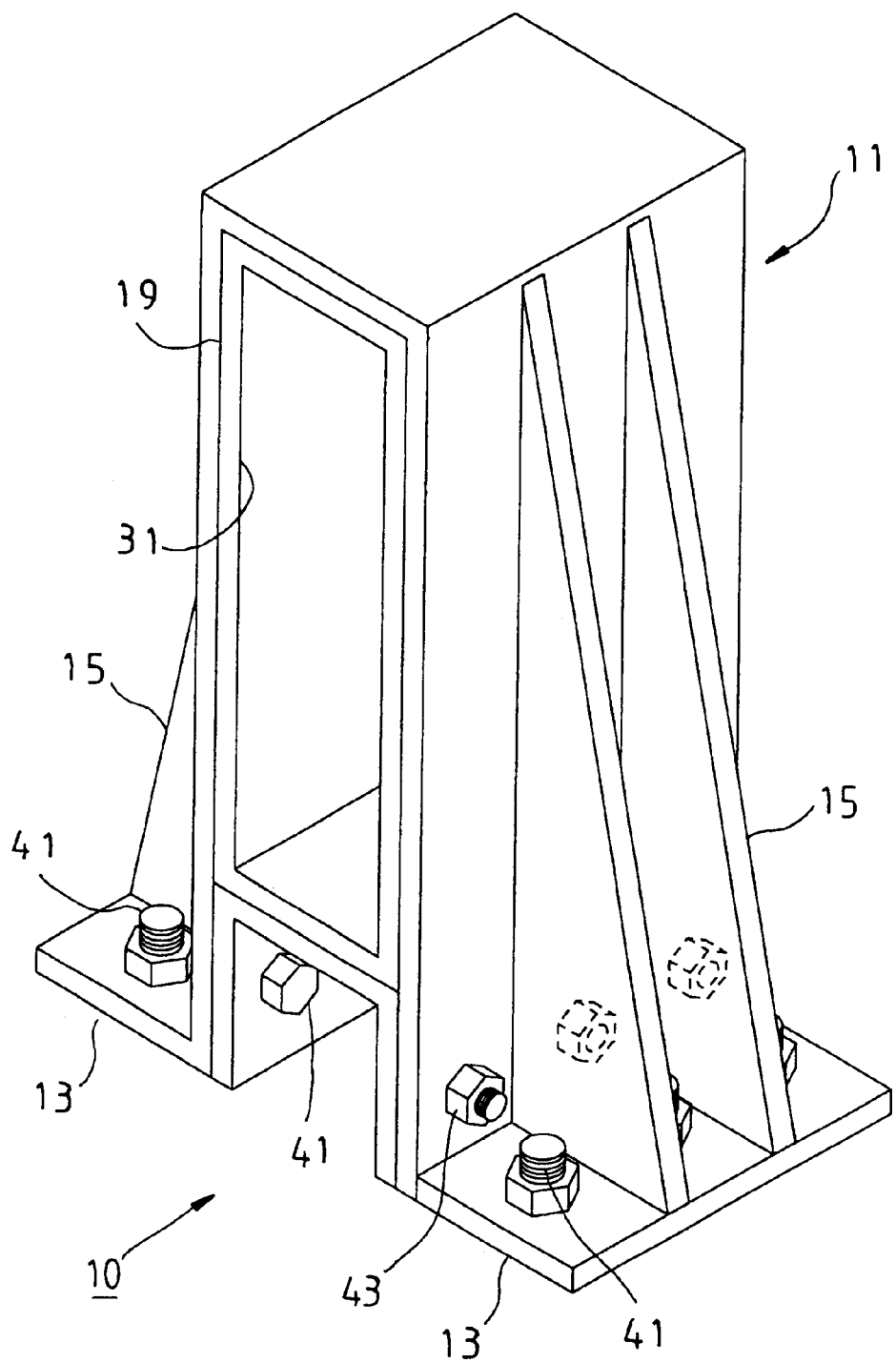
FIG. 2 shows a perspective view of the preferred embodiment of the present invention in combination.

As shown in FIGS. 1–2, a support frame 10 of the preferred embodiment of the present invention comprises a support board 11 and a pad support 21.

The support board 11 has an inverted U-shaped cross section and is provided at the bottom end of two side segments thereof with a level board 13 extending outwards. Each side segment and each level board 13 are provided therebetween with a plurality of reinforcing ribs 15.

The pad support 21 has an inverted U-shaped cross section and is located at the bottom of the support board 11 such that the pad support 21 is disposed between two side segments of the support board 11. The pad support 21 and the support board 11 are fastened securely by a plurality of bolts 41 and nuts 43. The bolts 41 are put through the two side segments of the pad support 21 and two side segments of the support board 11 such that the bolts 41 are engaged at another end thereof with the nut 43. A receiving space 19 is formed between the pad support 21 and the support board 11.

The present invention further comprises:

A buffer pad body 31 which is made of a rubber material and is rectangular in its cross section. The buffer pad body 31 is disposed in the receiving space 19 such that the outer peripheral surface of the buffer pad body 31 is attached to the inner side of the support board 11 and the top of the pad support 21.

The level boards 13 are fixed on the ground surface by a plurality of bolts 41 to provide a tremendous fixation force. The heavy-duty machinery is securely fixed on the ground surface by a plurality of the support frames 10 which are mounted at the base of the heavy-duty machinery.

Figure 3:
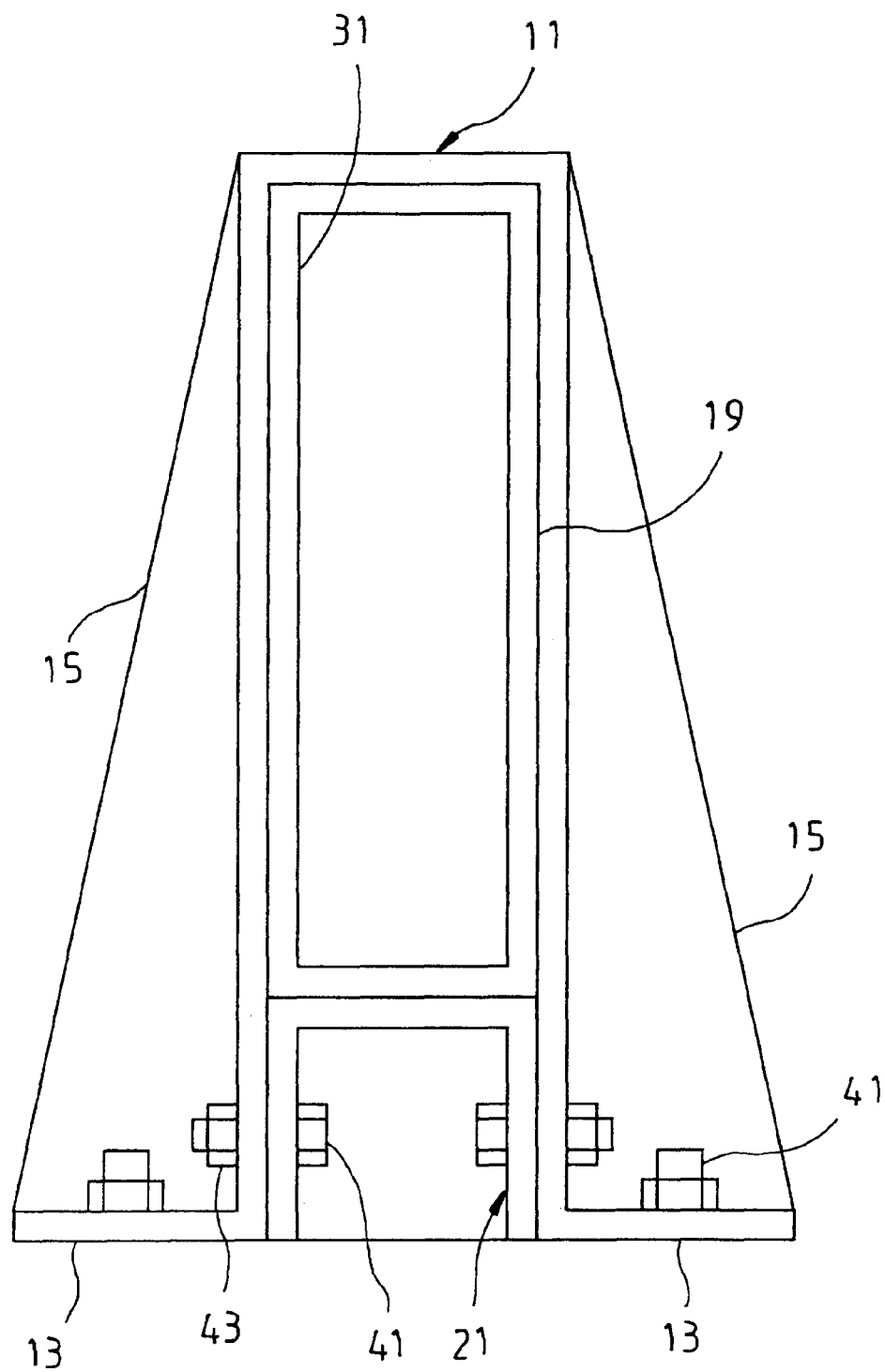
FIG. 3 shows a front view of the preferred embodiment of the present invention in combination.

As shown in FIG. 3, the use of the present invention involves a first step in which the pad support 21 is placed on the ground surface. Thereafter, the support board 11 is placed from the top toward the bottom such that two side segments thereof are located at two sides of the pad support 21. The support board 11 and the pad support 21 are securely fastened by a plurality of bolts 41. The level boards 13 are fixed on the ground surface by a plurality of bolts 41. The receiving space 19 is formed between the support board 11 and the pad support 21. The buffer pad body 31 is disposed in the receiving space 19. The assembly of the present invention is thus completed.

Figure 4:
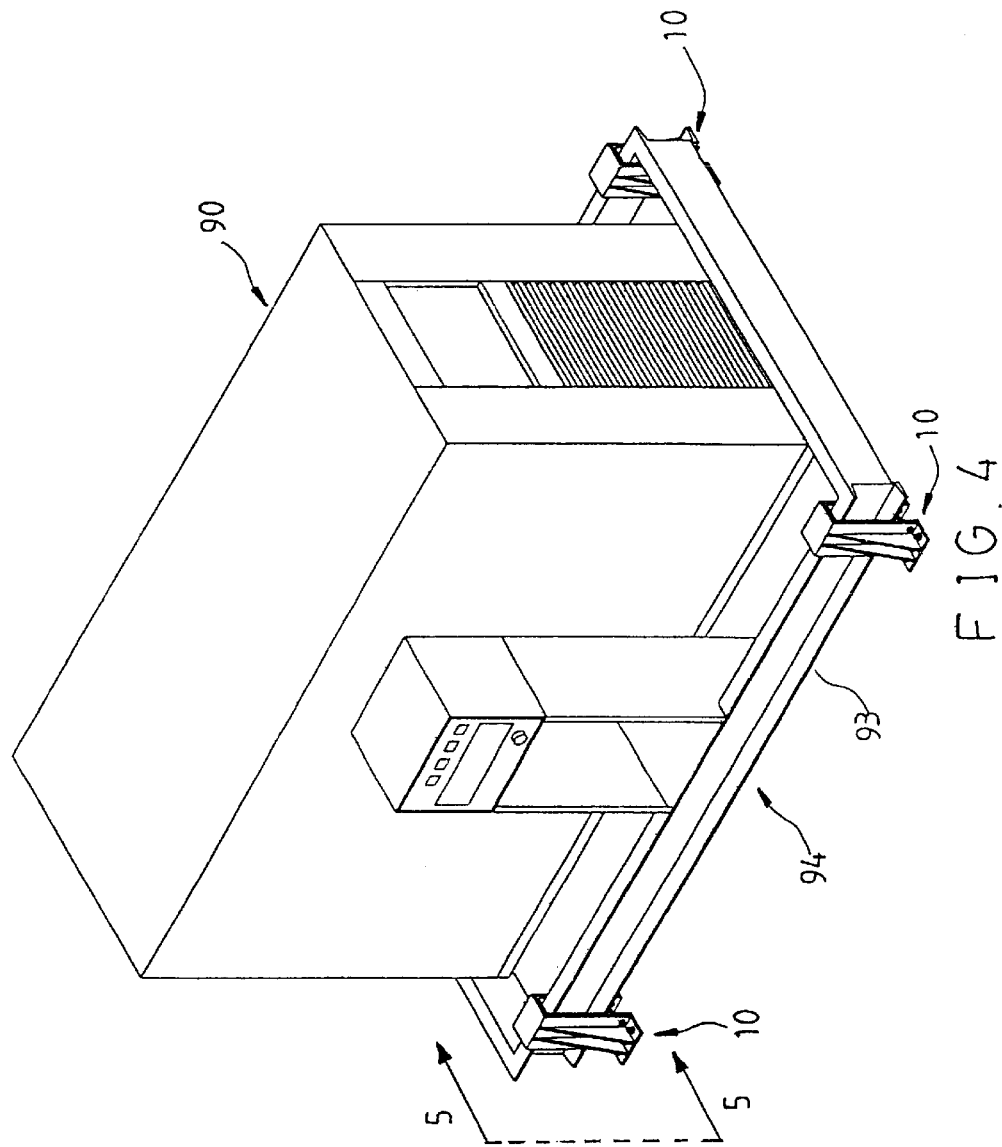
FIG. 4 shows a schematic view of the preferred embodiment of the present invention being mounted at the bottom of a machinery stand.
Figure 5:
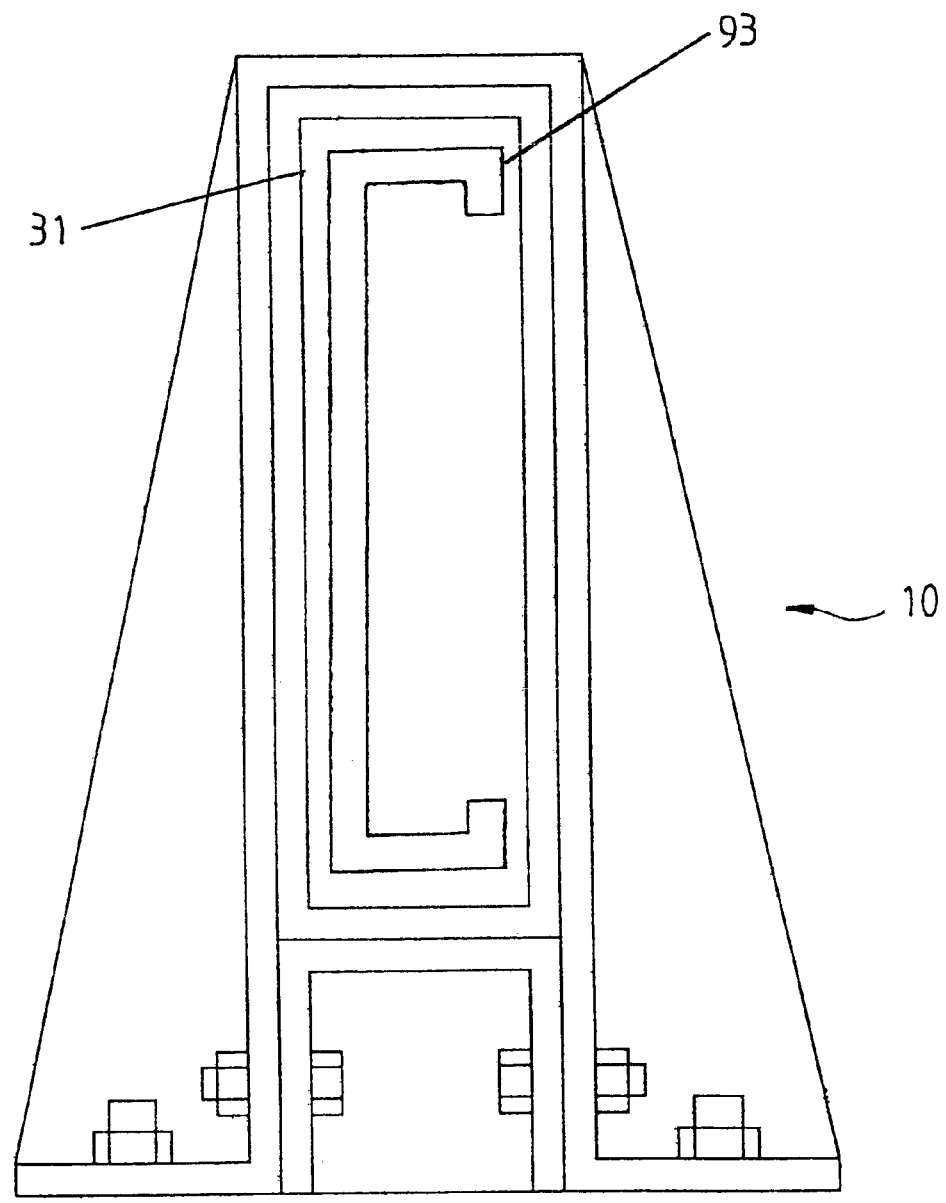
FIG. 5 shows a cross-section along section line 5—5 of FIG. 4

As shown in FIG. 4, a plurality of support frames 10 of the present invention are placed on a ground surface on which a heavy-duty machinery 90 is to be located. A plurality of long beams 93 are put through the buffer pad body 31 of each of the support frames 10 such that the long beams 93 are connected, thereby resulting in a support body 94 on which the heavy-duty machinery 90 is fixed. In the meantime, each long beam 93 is fixed by the support frames 10. In the event of a relatively strong earthquake, the heavy-duty machinery 90 and the support body 94 bring about an inertia force relative to the ground surface translocation. Each long beam 93 presses against and impacts the support board 11 and the pad support 21 via the buffer pad body 31. In light of the fixation of these bolts 41 and the reinforcement of these reinforcing ribs 15, a tremendous fixation force and a tremendous structural strength are effected to secure these long beams 93. As a result, the heavy-duty machinery 90 is securely fixed. The buffer effect is brought about by the buffer pad body 31 to reduce impact force and noise at the time when the collision of the long beam 93 takes place.

The present invention has advantages, which are described hereinafter.

The fixation force of the present invention is excellent. The structural degree of the present invention is exceedingly high so as to locate effectively on the ground surface. In addition, the present invention has a tremendous horizontal support force and a tremendous vertical support force, so as to withstand a tremendous horizontal thrust force and a tremendous vertical thrust. As a result, the support body on which the heavy-duty machinery is located can be securely fixed. A plurality of the support frames of the present invention can be mounted in various directions at the bottom of the heavy-duty machinery to provide effectively a horizontal support force, a longitudinal support force and a vertical support force, which work together to hold securely the heavy-duty machinery on the ground surface.

The present invention averts the damage to the machinery and the injury to the machine operator in the event of an earthquake in which the present invention holds the machinery securely on the ground surface, thereby preventing the machinery from swaying and translocating to hit other machineries or machine operators.

The present invention ensures the availability of the standby power supply. When an electric generator is securely fixed by the present invention, the electric generator does not translocate in the event of an earthquake, thereby preventing the separation of electric power lines or oil pipes. The electric generator in operation can continue to supply the power. In other words, in light of the fixation effect of the present invention, the electric generator is effectively capable of a power transmission in case of emergency.

It is therefore readily apparent that the support frame of the present invention has advantages over the prior art structures. The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following claims.

What is claimed is:

1. A plurality of support frames for preventing a heavy-duty machinery from falling, each of said support frames comprising:

a support board having an inverted U-shaped cross section, said support board being provided at a bottom end of two side segments thereof with a level board extending outwards, each of said side segments and each of said level boards being provided therebetween with at least one reinforcing rib;

a pad support having an inverted U-shaped cross section, said pad support being located at the bottom of said support board such that said pad support is disposed between the two side segments of said support board, said pad support being connected with said support board, wherein said pad support and said support board are provided with a receiving space formed therebetween; and a buffer pad body having a rectangular cross section, said buffer pad body being disposed in said receiving space such that an outer peripheral surface of said buffer pad body entirely engages inner sides of said support board and a top of said pad support;

wherein said level boards of each of the plurality of support frames are fixed on a ground surface to provide a fixation force;

wherein each of the plurality of support frames buffer pad body has a hole therethrough encircling a long beam of a support body on which the heavy-duty machinery is fixed, the buffer pad body of each of the plurality of support frames being spaced away from the long beam in a manner permitting the buffer pad body to engage the long beam only during an earthquake.

2. The plurality of support frames as defined in claim 1, wherein said buffer pad body is made of a rubber material.

3. The plurality of support frames as defined in claim 1, wherein said support board and said pad support are fastened by a plurality of bolts and nuts.

4. The plurality of support frames as defined in claim 3, wherein said bolts are put through one side segment of said support board and one side segment of said pad support such that other ends of said bolts are engaged with said nuts.

5. The plurality of support frames as defined in claim 1, wherein the plurality of support frames is greater than two.

6. The plurality of support frames as defined in claim 1, wherein the plurality of support frames is at least four.

\* \* \* \* \*